Dec. 20, 1949     G. A. LYON     2,491,505
WHEEL COVER
Filed May 12, 1945
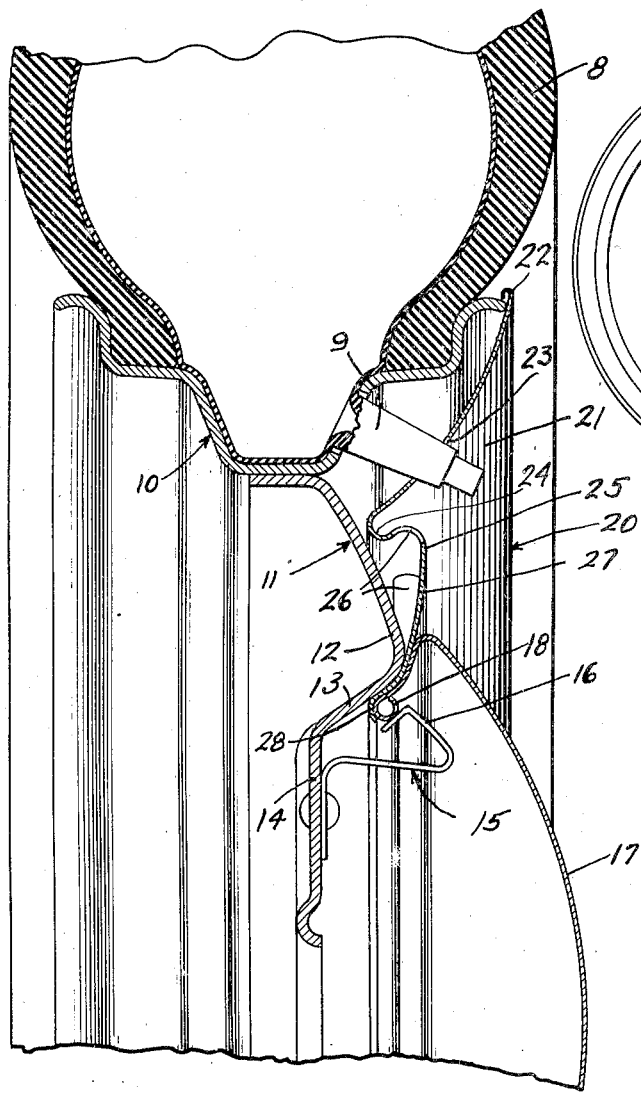
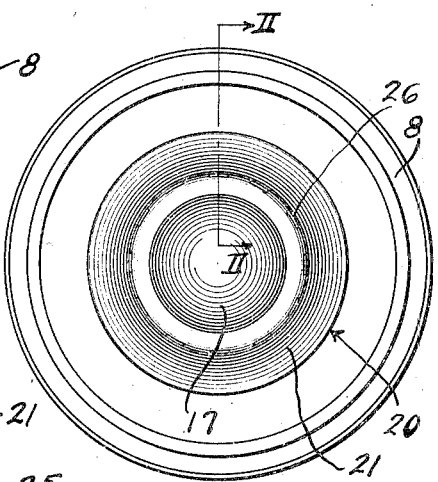
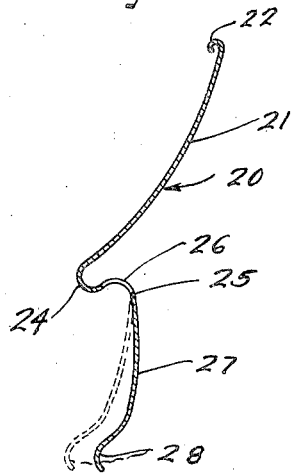
Inventor
GEORGE ALBERT LYON
by The Firm of Charles W Hills Attys.

Patented Dec. 20, 1949

2,491,505

UNITED STATES PATENT OFFICE 2,491,505

WHEEL COVER

George Albert Lyon, Allenhurst, N. J.

Application May 12, 1945, Serial No. 593,478

6 Claims. (Cl. 301—37)

This invention relates to a wheel structure and more particularly to a novel wheel trim or cover therefor.

An object of this invention is to provide an improved wheel cover for an automobile wheel wherein provision is made in the cover for automatically accommodating manufacturing variations in the parts of the wheel.

Another object of this invention is to provide an improved simplified form of metallic wheel cover for an automobile wheel which lends itself to production on a large scale basis, such as by stamping in a punch press.

In accordance with the general features of this invention, there is provided in a cover structure for a wheel including a tire rim and body part a wheel cover for disposition over said parts and having an intermediate apertured part for enabling a central portion of the cover to be axially deflected toward the body part whereby said central portion may be detachably fastened or clamped to the body part of the wheel to retain the cover on the wheel.

Another feature of the invention relates to the forming of the aforesaid cover with a plurality of concentric portions, one for disposition over the flanges of the rim part of the wheel and the other for disposition over the body part of the wheel, the two portions being connected by an apertured portion which enables the lateral deflection of the central portion into retained contact with the body part of the wheel.

Other objects and features of this invention will more fully appear from the following detailed description taken in connection with the accompanying drawings, which illustrate a single embodiment thereof and in which Figure 1 is a side view of a wheel structure embodying the features of this invention;

Figure 2 is an enlarged fragmentary cross-sectional view on the line II—II of Figure 1 looking in the direction indicated by the arrows; and Figure 3 is a fragmentary cross sectional view through a portion of the cover and showing how the central part of the cover may be deflected laterally by reason of the apertures in the intermediate part of the cover.

As shown on the drawings:

In the accompanying drawings the wheel proper is more or less of a conventional construction. This wheel carries the usual pneumatic automobile tire and tube 8 and which includes the usual valve stem 9 projecting through one of the flanges of a tire rim 10. The tire rim 10 is of a conventional type and is known to the trade as the drop center multi-flange type of tire rim. This rim is supported and carried by a central load bearing or body part 11 which is suitably secured to the base flange of the tire rim 10 in a manner well known to those skilled in this art.

The body part 11 which comprises a dished or shell-like stamping includes an axially bulged nose 12 terminating in an inclined portion 13 which in turn ends in a generally radially extending bolt-on flange 14. This flange is adapted to be secured in the usual manner to a part of a wheel such as a brake drum by means of cap screws, bolts or the like (not shown).

The bolt-on flange 14 carries a plurality of spring clips 15 which may be of any suitable number, such for example as three or four and are adapted in the conventional automobile structure to hold the hub cap on the wheel. Each of these spring clips 15 includes a turned free extremity 16 which is cooperable with the hub cap.

The spring clips 15 are of a type known to the trade as the inverted spring clip. That is to say, the extremity 16 is turned back upon the body of the clip at such an angle as to enable a resilient wedged clamping engagement of the hub cap with the body part of the wheel.

In the drawing as best shown in Figure 2, the hub cap which is preferably made of metal is designated generally by the reference character 17 and includes the usual central crown portion and an underturned retaining curled or rolled edge 18 adapted to be cammed over the high points of the free extremities 16 of the spring clips 15.

My invention is particularly concerned with the provision of a wheel cover for covering the exposed surfaces of the wheel between the hub cap and the outer curled edge of the tire rim 10. I have designated this cover of my invention generally by the reference character 20. It should be noted at this time that this cover may be made of any suitable material although excellent results may be obtained by stamping it from sheet metal such for example as stainless steel or the like.

The cover 20 includes an outer annular portion 21 which extends generally radially and axially inwardly from an outer turned edge 22 to a point over the body part 11 of the wheel. The turned edge 22 overhangs the outer edge of the tire rim in close proximity to the outer side wall of the tire 8.

The arrangement of this portion 21 including its annular formation is such that in use it appears to constitute a continuation of the side wall of the tire. Moreover, if the outer surface of this portion 21 is given a white finish it will in use appear to constitute a white side wall part of the tire, in which event the tire appears to extend clear down to the body part 11 of the wheel.

I also provide this portion 21 with an aperture 23 through which the valve stem 9 may extend in order to afford access to the valve stem without necessitating removal of the wheel cover from the wheel.

The annular cover portion 21 terminates in a goose-neck like portion 24 directly over the body part 11. This goose-neck like portion 24 in reality constitutes a reinforcing rib which rigidifies the cover at an intermediate portion.

The portion 24 in turn is connected to a curved outwardly projecting rib portion 25 which is formed on the outer margin of a generally radially extending central portion 27, the inner edge of which is slightly turned at 28 so as to fit under and embrace the turned edge 18 of the hub cap. Taken together, the undulating annular respective radially inwardly and radially outwardly humped rib portions 24 and 25 provide a generally axially extending juncture rib structure or flange between the radially outer and radially inner cover portions 21 and 27, the formation of the flange being of generally S-shape. The rib-like portion 25 of the cover is provided with a plurality of apertures 26 for enhancing the flexibility of the portion 27 with respect to the remaining portions of the wheel cover 20. I have illustrated in Figure 3 how the portion 27 may be deflected axially upon the application of pressure thereto such as the pressure of a hub cap being clamped thereagainst.

In the application of this cover to the wheel, the cover is first aligned with the wheel so that the valve stem 9 projects through the aperture 23 thereof, and so that the outer edge 22 is brought to bear against the outer edge of the rim of the wheel. Thereafter the hub cap is placed over the center of the cover and is pressed axially inwardly toward the wheel body part until it is snapped home into retained cooperation with the free extremities 16 of the spring clips 15. During this operation the inner portion 27 of the cover is deflected axially toward and into retained cooperation with the body part 11 of the wheel. In fact, it is pressed into tight retained engagement with the nose 12 and the inclined portion 13 of the body part.

This is decidedly advantageous since it enables the cover to automatically accommodate for manufacturing variations in the rim and body parts of the wheel. For example, in the fabrication of these parts, it is permissible to have as much as one-eight of an inch variation in the relative location of these parts and with respect to the medial plane of the wheel.

The hub cap may be easily removed from the wheel 17 by the usual pry off tool and after removal the cover 20 may of course then be easily displaced from the wheel.

I claim as my invention:

1. As an article of manufacture, an annular wheel cover adapted to be applied to the outer side of a vehicle wheel including tire rim and body portions, the cover member comprising concentric annular portions and an intermediate integral generally S-shaped juncture rib structure connecting said portions, the outer of said annular portions being adapted to lie in concealing relation to the tire rim and the inner of said portions being adapted to lie in clamped relation between the wheel body and a hub cap applied to the wheel body and in such clamped relation to be placed in inwardly deflected tension, said S-shaped juncture comprising a radially inwardly humped rib portion at the adjacent margin of the outer annular cover portion and a radially outwardly humped rib portion at the adjacent margin of the inner annular portion, said outwardly humped portion having an annular series of apertures therein rendering the same flexible while the inwardly humped rib portion is of unaffected rigidity so that the tensioned condition of the inner annular cover portion effects flexing of said apertured outwardly humped rib portion without substantially affecting said inwardly humped rib portion or the outer portion of the cover annulus.

2. In a cover structure for a wheel including tire rim and body parts and in which the body part is provided with a hub cap adapted to be retained thereon by retaining means on the body part, an annular wheel cover for disposition between the hub cap and the rim and comprising concentric annular portions the central one of which has the inner margin thereof adapted to be engaged by the hub cap and to be deflected inwardly into the retaining cooperation with the wheel by the hub cap, said annular portions of the cover being connected by an undulating annular rib structure including a generally radially inwardly extending rib at the contiguous radially inner margin of the outer annular portion of the cover and a generally radially outwardly projecting rib at the radially outer margin of the central portion of the cover, said radially outwardly projecting rib being axially outwardly offset relative to the radially inwardly projecting rib portion.

3. In an annular cover for disposition at the outer side of a vehicle wheel in covering relation to the tire rim and an adjacent body portion of the wheel, said annular cover including concentric annular portions the outer of which is adapted to be disposed in covering relation to the tire rim and the inner of which is adapted to be disposed in covering relation to the wheel body and further adapted to be flexed inwardly by engagement of a hub cap for clamping the same to the wheel body, said annular cover portions having an integral intermediate radially facing offsetting juncture flange of generally S-shaped cross section extending generally axially therebetween and with the adjacent margins of said cover portions being substantially offset axially by said juncture flange, said juncture flange having a series of apertures therein weakening the same for ready bending relative to said outer portion of the cover upon deflection of said inner cover portion.

4. In an annular cover for disposition at the outer side of a vehicle wheel in covering relation to the tire rim and an adjacent body portion of the wheel, said annular cover including concentric annular portions the outer of which is adapted to be disposed in covering relation to the tire rim and the inner of which is adapted to be disposed in covering relation to the wheel body and further adapted to be flexed inwardly by engagement of a hub cap for clamping the same to the wheel body, said annular cover portions having an integral intermediate offsetting juncture portion of generally S-shaped cross section extending generally axially and with the adjacent margins of said cover portions being substantially offset axially by said juncture portion, said juncture portion being bendable relative to said outer portion of the cover upon deflection of said inner cover portion, said intermediate offsetting juncture portion being humped radially outwardly at the axially outer side thereof contiguous to the radially inner portion of the cover and extending radially outwardly beyond the axially inner area of said intermediate offsetting portion.

5. In an annular cover for disposition at the outer side of a vehicle wheel in covering relation to the tire rim and an adjacent body portion of the wheel, said annular cover including concentric annular portions the outer of which is adapted to be disposed in covering relation to the tire rim and the inner of which is adapted to be disposed in covering relation to the wheel body and further adapted to be flexed inwardly by engagement of a hub cap for clamping the same to the wheel body, said annular cover portions having an intermediate integral offsetting juncture portion extending generally axially and with the adjacent margins of said cover portions being substantially offset axially by said juncture portion, said juncture portion being bendable relative to said outer portion of the cover upon deflection of said inner cover portion, said intermediate offsetting juncture portion being humped radially outwardly at the axially outer side thereof contiguous to the radially inner portion of the cover and extending radially outwardly beyond the axially inner area of said intermediate offsetting portion, said radially outwardly humped portion having an annular series of apertures therein weakening the same relative to said axially inner area whereby to render said humped portion resiliently flexible to accommodate deflection of the radially inner portion of the cover.

6. In a wheel structure including a multi-flange tire rim and a load sustaining body portion including an annular axially outwardly projecting reinforcing nose bulge, a hub cap, retaining means on the wheel body retainingly engageable with the hub cap to hold the hub cap seated on the nose bulge, and a trim annulus for substantially concealing the tire rim and the wheel body radially outwardly from said hub cap, said annulus comprising radially inner and radially outer portions and an intermediate annular radially facing juncture rib of generally S-shaped cross section between the adjacent margins of the sections, the inner margin of the outer section being disposed in substantial axially inwardly offset relation to the adjacent margin of the inner section by said junction rib, said inner section extending directly and in a substantially continuous, unbroken plane in cross section to and engaging said nose bulge behind the hub cap and clamped to the nose bulge by the hub cap, said inner section being axially deflectable, and said intermediate juncture rib isolating the flexing action of the inner section from the outer section.

GEORGE ALBERT LYON.

REFERENCES CITED

The following references are of record in the file of this patent:

UNITED STATES PATENTS

| Number | Name | Date |
| --- | --- | --- |
| Re. 21,179 | Lyon | Aug. 22, 1939 |
| 2,308,617 | Lyon | Jan. 19, 1943 |
| 2,368,232 | Aske | Jan. 30, 1945 |